United States Patent
Materna

[19]

[11] Patent Number: 5,939,005
[45] Date of Patent: Aug. 17, 1999

[54] CANDLE FORMING METHOD

[75] Inventor: Kim Christie Materna, Waukesha, Wis.

[73] Assignee: S.C. Johnson & Son, Inc., Racine, Wis.

[21] Appl. No.: 09/182,557

[22] Filed: Oct. 29, 1998

[51] Int. Cl.⁶ .................................................. B29C 39/18
[52] U.S. Cl. .......................... 264/255; 264/263; 264/267; 264/268; 264/275; 425/803
[58] Field of Search ................. 264/271.1, 255, 264/263, 267, 268, 275; 425/803; 431/289

[56] References Cited

U.S. PATENT DOCUMENTS

| | | |
|---|---|---|
| 574,376 | 1/1897 | Baumer . |
| 873,073 | 12/1907 | Nordfors . |
| 2,291,067 | 7/1942 | Atkins ...................................... 431/291 |
| 2,520,682 | 8/1950 | Harrison et al. . |
| 3,015,847 | 1/1962 | Holden et al. . |
| 3,721,419 | 3/1973 | Bolinger . |
| 3,724,982 | 4/1973 | Davis . |
| 3,799,492 | 3/1974 | O'Laughlin . |
| 3,831,899 | 8/1974 | Doig . |
| 3,974,996 | 8/1976 | Violet . |
| 3,998,922 | 12/1976 | Weiss . |
| 4,004,773 | 1/1977 | Binder . |
| 4,134,718 | 1/1979 | Kayfetz et al. ........................... 431/125 |
| 5,353,827 | 10/1994 | Bouchard et al. ........................... 137/1 |
| 5,690,484 | 11/1997 | Leonard et al. ........................ 431/291 |

FOREIGN PATENT DOCUMENTS

| | | |
|---|---|---|
| 19 30 568 | 2/1971 | Germany . |
| 22 02 784 | 8/1973 | Germany . |

Primary Examiner—Jan H. Silbaugh
Assistant Examiner—Stefan Staicovici

[57] ABSTRACT

Methods for making candles are disclosed, as are candles made using that method. A wick holder and wick are positioned at the bottom of a container. A sleeve/shroud is then positioned in the cavity to protect them during molding. Molten wax is poured into the cavity outside the sleeve. The wick is centered using the sleeve after the wax has been added. While the wax is only partially hardened the sleeve is then removed. Remaining molten wax then surrounds the wick.

7 Claims, 1 Drawing Sheet

CANDLE FORMING METHOD

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to methods for forming candles. More particularly, it relates to techniques for supporting and centering wicks of candles during production.

Candles have been used as a source of light for centuries. They have also been used to dispense materials into the air. For example, citronella oil has been dispersed into candle wax such that when the candle is lit fumes will be dispensed into the air which repel insects.

One way to properly position a wick in a candle as the candle is being formed is to tie the top of the wick to a support that bridges the top of the candle mold. The wick then hangs down in a straight line (much as a plumb line would). However, this technique is somewhat time consuming and requires bridging equipment.

In U.S. Pat. No. 3,998,922 a removable rod is positioned in a candle mold at a position where the wick will later be placed. Molten wax is allowed to partially solidify around the rod in the mold and the rod is then removed. A wick was then inserted into the cylindrical hole left by the rod. Inserting the wick using this method is somewhat awkward.

Another approach relies on holders that support the wick from the bottom (see e.g. U.S. Pat. No. 3,998,822). These holders have a tendency to allow the top portion of the wick to droop off-center when the wax is added, and often require the use of extra metal or a gluing step to ensure proper centering of the bottom of the wick.

Thus, it can be seen that a need exists for an improved method for forming candles.

BRIEF SUMMARY OF THE INVENTION

In one aspect the invention provides a method for making a candle. A container is provided that has a bottom inner wall and an inner cavity. A wick holder with a wick therein is positioned in the cavity on the bottom inner wall and a sleeve is positioned in the cavity so that it at least partially surrounds the sides of the wick (e.g. completely surrounds the sides except for the top of the wick).

A flowable fuel is then introduced into the cavity around the sleeve. Preferred flowable fuels are powders, granules, beads, and liquids. An especially preferred flowable fuel is a wax such as paraffin wax or beeswax. Citronella oil or another insect repellant, insecticide, fragrance, or fumigant can be incorporated into the fuel.

In preferred methods, the fuel partially hardens around the sleeve and the sleeve is then removed from the cavity while leaving the wick holder and wick in the container. Alternatively, when granular beads or other solid materials are used, the sleeve is removed after the solid is poured around the sleeve. In either case, the remaining flowable fuel then moves against the wick.

The wick holder can have an essentially flat base and a hollow, upwardly open support post that receives a lower end of the wick. When the sleeve surrounds the wick it can rest on the flat base of the wick holder, or alternatively on the bottom of the container.

The interior of the sleeve can taper near its upper end. This permits the wick to be pushed to the vertical as the sleeve drops down to cover it.

In another preferred form of the invention, the wick holder and wick are centered on the bottom inner wall of the container after the fuel has been added to the container.

In yet another embodiment the invention provides a candle that was made using the above methods.

In still another aspect the invention provides a kit for making a candle, comprising the above container, wick, wick holder, and sleeve.

The "container" may be glass, pottery, or other material, and may be designed to stay with the candle during use. Alternatively, it may be a mold from which a candle is removed after it is formed.

The sleeve is preferably made from Pyrex® plastic, glass or another material resistant to temperatures above 125° C. A pipette shape has been found to be particularly suitable as it has a hole at both ends. Wax lodged in the lower end of a pipette can be poked, blown, or melted out between uses. When granular beads or other solids are used, the top of the sleeve need not be open.

Note especially that the wick holder does not need to have elongated centering legs that extend to the side walls of the container in order to locate the center position. Instead, after the wax has been added, the top edge of the sleeve can be used to push the wick and wick holder to the center position.

The objects of the present invention therefore include providing methods of the above kind which:

(a) properly center the wick in a candle;

(b) insure that the top part of the wick is vertical;

(c) avoid the need for complicated hanging equipment for supporting wicks from above during production; and (d) which are relatively inexpensive to use. These and still other objects and advantages of the present invention (e.g. providing candles that are made using such methods) will be apparent from the descriptions which follows. The following descriptions are merely of the preferred embodiments.

DETAILED DESCRIPTION OF THE INVENTION

Figure 1:
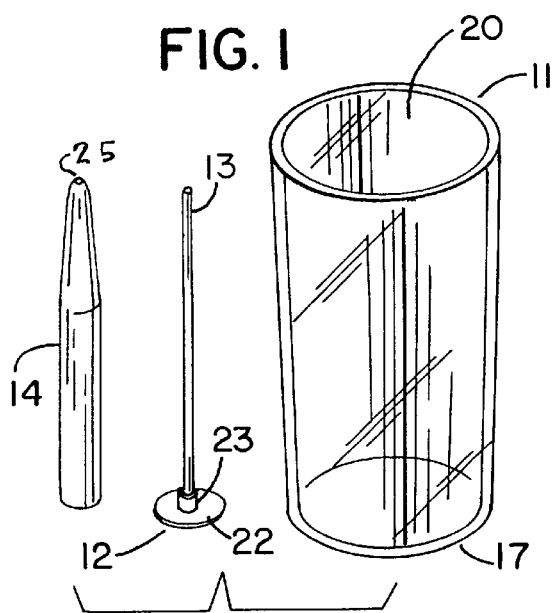
FIG. 1 is a frontal perspective view of several components of the invention.

A candle (generally 10) is made from a container 11, wick holder 12, wick 13, sleeve 14, and wax 15. The container 11 has an inside bottom wall 17 and side wall 18 that define an internal cavity 20. The container also has a portion of its top open.

The wick holder 12 (preferably of stamped metal) has a disk-like base 22 (of about 3 cm diameter) that has a central upwardly extending hollow cylindrical portion 23. The cylindrical portion 23 receives the wick 13.

Wick 13 is preferably made from cotton fiber, but may be made of other known wick materials such as flax, fiberglass, paper, or blends thereof.

The sleeve 14 has an upper part 25 (shown as open in this version), a surrounding substantially vertical wall 26, a bottom opening 27, and an interior channel 28 that is sized so as to receive the wick and the top of the wick holder. The top of the sleeve 14 (and thus the internal channel 28) tapers so that the wick is pushed to the vertical as the sleeve is moved down to surround the wick.

Figure 2:
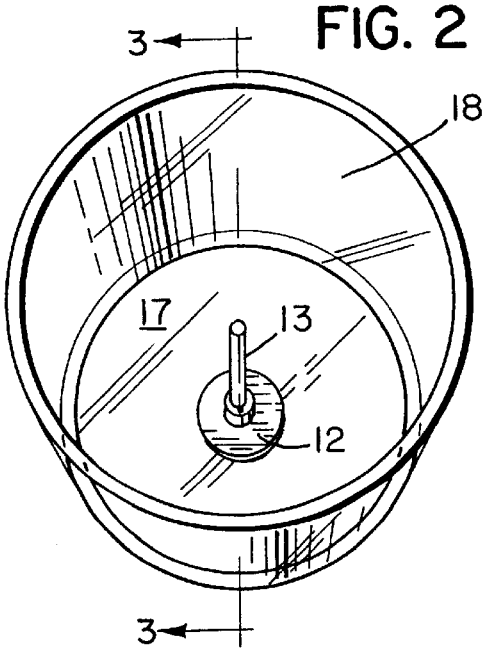
FIG. 2 is a top perspective view of a container in which has been inserted a wick holder and wick.
Figure 3:
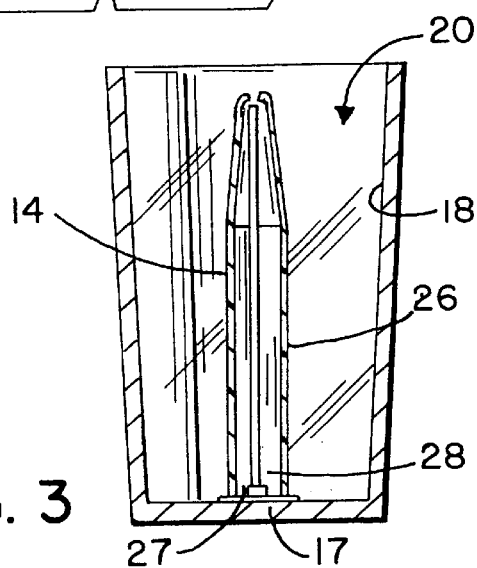
FIG. 3 is a vertical sectional view of the FIG. 2 subassembly, with a sleeve also provided to enclose the wick and wick holder.

As best seen from FIGS. 1–3, the wick holder 12 is positioned on the bottom inner wall 17 of the empty container 11. It does not need to be glued in place (but may be). The wick 13 can be inserted in the holder before the holder is positioned in the container, or it can be inserted after the holder is on the bottom wall. Also, both can be prepositioned in the sleeve before positioning in the container.

As best seen in FIG. 3, the sleeve 14 is positioned over the wick holder 12 so that it rests on the base/disk 22. Alternatively, it may rest on the bottom of the container. It surrounds the sides of the wick. Molten wax 15 is then added. The sleeve, wick holder and wick can at that point be centered/recentered as a unit in the container while the wax is molten by grasping its top and using it to drag/push the wick holder.

Figure 4:
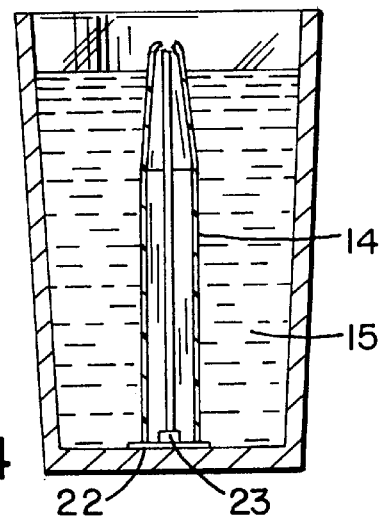
FIG. 4 is a sectional view, similar to FIG. 3, albeit with molten wax surrounding the sleeve.
Figure 5:
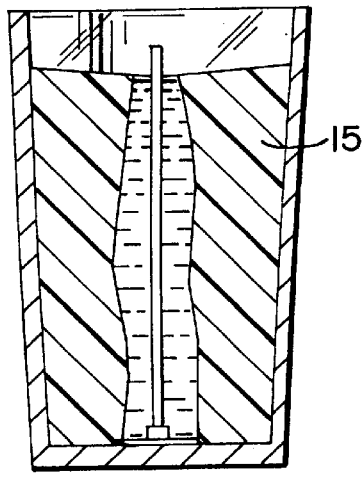
FIG. 5 is a sectional view, similar to FIG. 4, albeit with some of the wax hardened, the sleeve removed, and with the rest of the wax in a molten state.
Figure 6:
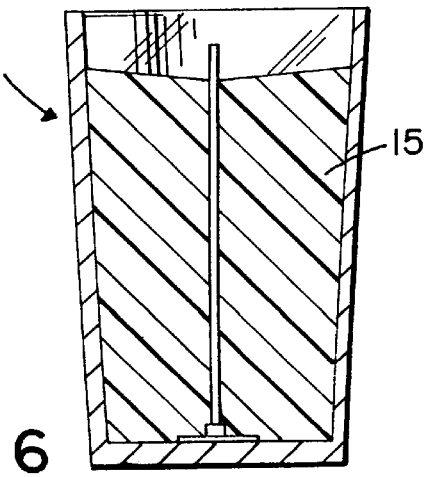
FIG. 6 is a view, similar to FIG. 5, albeit with the wax completely solidified.

After the wax is added it first partially hardens (see FIG. 4). Prior to the wax completely hardening the sleeve is removed. Remaining liquid wax fills up the gap (FIG. 5). The sleeve is so narrow that the wick remains substantially vertical until the candle has hardened enough to support the wick itself.

While a preferred embodiment of the present invention have been described above, other alternatives are intended to be within the scope of the invention. For example, the container might instead constitute a multi-piece mold structure that is removed after the candle hardens. Also, the sleeve could have other cross sectional shapes besides a circular one. The claims should be therefore looked to determine the full scope of the invention.

INDUSTRIAL APPLICABILITY

The present invention is useful in making candles.

What I claim:

1. A method for making a candle in a container that has a bottom inner wall and an inner cavity, comprising the steps of:

positioning a wick holder that supports a wick, and the wick, in the cavity adjacent the bottom inner wall along with a sleeve that at least partially surrounds the wick;

introducing a liquid fuel into said cavity around the sleeve;

permitting the liquid fuel in the cavity to partially harden around the sleeve to the extent that the partially hardened fuel is capable of causing the top part of the wick to remain substantially vertical when the sleeve is removed from the cavity; and thereafter removing the sleeve from the cavity while leaving the wick and wick holder in the container, the partially hardened fuel then maintaining the top part of the wick substantially vertical while remaining liquid fuel moves against the wick, the fuel then completely hardening to make the candle.

2. The method of claim 1, wherein the wick holder has an essentially flat base and a hollow support post extending upward therefrom that receives and supports a lower end of the wick.

3. The method of claim 2, wherein the sleeve rests on the flat base of the wick holder.

4. The method of claim 1, comprising the further step of centering the wick holder and wick on the bottom inner wall of the container after the fuel has been added to the container and before the sleeve is removed from the cavity.

5. The method of claim 1, wherein the liquid fuel is wax.

6. The method of claim 5, wherein the wax is added to the container in a molten state, and is still partially molten when the sleeve is being removed from the container.

7. The method of claim 1, wherein the sleeve has an internal hollow which tapers near its upper end.

\* \* \* \* \*